United States Patent Office 2,784,172
Patented Mar. 5, 1957

2,784,172

ACRYLONITRILE COPOLYMERS STABILIZED WITH ACRYLIC ACID SALTS

Robert J. Slocombe, Dayton, and George L. Wesp, Englewood, Ohio, assignors to Monsanto Chemical Company, St. Louis, Mo., a corporation of Delaware No Drawing. Application April 27, 1953,
Serial No. 351,469

6 Claims. (Cl. 260—45.85)

This invention relates to methods of preparing polymers of acrylonitrile which are stabilized with respect to thermodiscoloration. More specifically the invention relates to methods of converting unstable polymers of acrylonitrile into color-stable polymers.

Although polyacrylonitrile and copolymers of 50% or more by weight of acrylonitrile and other monomers containing olefinic unsaturation copolymerized therewith are generally regarded as being materials of good thermostability, they are subject to discoloration. This phenomenon generally results because of the necessity for extruding and molding the composition at elevated temperatures. Furthermore, the higher acrylonitrile polymers find extensive use in the fabrication of fibers, films and fabrics which frequently are subjected to ironing operations at elevated temperatures. Thus, serious discolorations are often developed in the fabrication and processing of acrylonitrile polymers.

The primary purpose of this invention is to provide color-stable polymers of acrylonitrile. A further process of the invention is to facilitate molding and other processing procedures without the danger usually encountered at elevated temperatures, resulting in the deterioration of fibers and other forms of acrylonitrile polymers. A still further purpose of the invention is to provide substances which can be added to conventional polymers to induce resistance to heat discoloration.

It has been discovered that by adding certain salts and esters of acrylic acid to acrylonitrile polymers improved resistance to discoloration may readily be developed. The nature of the chemical reaction involved is not definitely understood, but it is believed that the color change is due to some impurities present in the polymer. It may be that the acrylate esters or salts contribute less to thermal discoloration than the impurity in its original form. The total stabilization may involve additive or synergistic effects.

The acrylonitrile polymers with which this invention may be practiced include polyacrylonitrile and copolymers of from 20 or more percent acrylonitrile and up to 80% of one or more of a wide variety of other unsaturated substances known to be copolymerizable with the acrylonitrile. Thus, the invention is practicable with the well-known fiber-forming copolymers of acrylonitrile which may be the copolymers of 75% or more of acrylonitrile and up to 25% of other monomers. Other copolymers of from 25% to 75% acrylonitrile and 75% to 25% of various other monomers, which copolymers have primary utility in the field of film and molding composition production are also useful.

The said other monomers with which the acrylonitrile may be copolymerized to produce resinous substances capable of use in the practice of this invention include vinyl acetate and other vinyl esters of monocarboxylic acids having up to 4 carbon atoms in the carboxylic acid radical, dimethyl maleate and dimethyl fumarate and other alkyl esters of fumaric acids wherein the alkyl radical has up to 4 carbon atoms, methyl methacrylate and other alkyl methacrylates wherein the alkyl radical has up to 4 carbon atoms, vinyl chloride and other vinyl halides, styrene, alpha-methylstyrene, and other vinyl and isopropenyl-substituted aromatic hydrocarbons, methacrylonitrile, vinylidene chloride, vinylpyridine, the vinyl derivatives of other alkyl-substituted pyridines and the vinyl derivatives of other compounds containing a tertiary amino atom in a heterocyclic ring, vinyl chloroacetate and vinyl esters of halo acetic acids, methallyl chloroacetate, allyl chloroacetate and chloroallylchloroacetate, and the corresponding esters of other haloacetic esters, vinylimidazole and other N-vinyl derivatives of heterocyclic nitrogen compounds, and one or more of these and other unsaturated compounds known to be copolymerizable with acrylonitrile.

The acrylic acid esters or inorganic salts useful in the practice of this invention are the esters of acrylic acid, having from 2 to 12 carbon atoms in the alcohol radical, for example, ethyl acrylate, butyl acrylate, butyl tin acrylate, octyl acrylate, cyclohexyl acrylate and phenyl acrylate. In general, those esters of acrylic acid may be used in which the alcohol radical is aliphatic or aromatic, being present as single-ringed cycloaliphatic and aromatic moieties. Other acrylate compounds which may be employed include magnesium, calcium, aluminum and strontium acrylates.

In the practice of this invention the stabilizer may be used to the extent of 0.01% to 10% by weight of the acrylonitrile polymer to be stabilized. Preferred practice of this invention involves the use of 0.1% to 3% of the stabilizer.

The invention may be practiced by combining the acrylonitrile polymer and the acrylic derivative by a wide variety of mechanical procedures. Thus, the polymer may be treated in grandular solid form and mixed physically with the compound or in aqueous or liquid solution or dispersion of the compound. The physical mixture may take place at room temperature or at higher temperatures, for example, the temperature at which polymer is semi-solid. A preferred practice insolves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will, to a large extent, depend upon the chemical composition of the acrylonitrile polymers.

The copolymers of 75% or more of acrylonitrile and up to 25% of the comonomer are well-known fiber-forming compositions and are generally resistant to the effect of most chemical solvents. In the preparation of solutions of such copolymers, solvents such as N,N,-dimethylformamide, N,N-dimethylacetamide, gamma-butyrolacetone, ethylene carbonate, maleic acid, acrylic acid, cinnamic acid, alphacyanoacetamide, and tris(dimethylamido) phosphate may be used.

In the treatment of the more soluble types of acrylonitrile polymers, for example, those of from 20% to 75% acrylonitrile and from 25% to 80% of other monomers copolymerizable therewith, the selection of a solvent is less critical. This type of copolymer may be dissolved by the various ketones, esters and aromatic hydrocarbon types of solvents. In general, the copolymer is placed in a suitable solution or softened and swelled by the selected medium so as to enable a more ready dispersion of the acrylic ester or salt within the said polymer. Obviously, a solvent which is also capable of dissolving, at least to some extent, the acrylic ester or salt, to be used will be exceptionally beneficial. However, the selection of the dispersing agent, the stabilizing agent and the particular method of dispersing the compounds in the solid polymer is a matter readily determined by one skilled in the art.

To evaluate the stabilizing action of various compounds, acrylonitrile polymers of different chemical and physical properties were used and the compound dispersed therein by a variety of methods.

Example

Polyacrylonitrile was stabilized by dissolving it in N,N-dimethylformamide and adding to separate solutions, 2% of each of the various compounds in the table below. Films were prepared therefrom and tested to determine the light-transmission properties by photoelectric methods. The transmission values set forth in the table below were measured after 40 minutes and three-hour periods of exposure at a temperature of 180° C. The ratings are expressed in the percentage of the transmission in excess of the transmission through a sample of the identical polymer not containing the stabilizing agent using a 410 millimicron filter in the photometer.

| | | |
|---|---|---|
| Magnesium acrylate | +13 | +70 |
| Calcium acrylate | +20 | +57 |

What we claim is:

1. A stable acrylonitrile polymer comprising a polymer of 20% to 100% of acrylonitrile and up to 80% of another monoolefinic monomer copolymerized therewith, said polymer containing intimately dispersed therein from 0.01% to 10% of a magnesium acrylate.

2. A stable acrylonitrile polymer comprising a polymer of 20% to 100% of acrylonitrile and up to 80% of another monoolefinic monomer copolymerized therewith, said polymer containing intimately dispersed therein from 0.01% to 3% of magnesium acrylate.

3. A stable acrylonitrile polymer comprising a polymer of 20% to 100% of acrylonitrile and up to 80% of another monoolefinic monomer copolymerizable therewith, said polymer containing intimately dispersed therein from 0.01% to 10% of calcium acrylate.

4. A stable acrylonitrile polymer comprising a polymer of 20% to 100% of acrylonitrile and up to 80% of another monoolefinic monomer copolymerizable therewith, said polymer containing intimately dispersed therein from 0.01% to 3% of calcium acrylate.

5. A stable acrylonitrile polymer comprising a polymer of 20% to 100% of acrylonitrile and up to 80% of another monoolefinic monomer copolymerized therewith, said polymer containing intimately dispersed therein from 0.01% to 10% of a compound selected from the group consisting of magnesium acrylate, calcium acrylate, aluminum acrylate, and strontium acrylate.

6. A stable acrylonitrile polymer comprising a polymer of 20% to 100% of acrylonitrile and up to 80% of another monoolefinic monomer copolymerized therewith, said polymer containing intimately dispersed therein from 0.01% to 3% of a compound selected from the group consisting of magnesium acrylate, calcium acrylate, aluminum acrylate, and strontium acrylate.

References Cited in the file of this patent

FOREIGN PATENTS

| | | |
|---|---|---|
| 999,594 | France | Oct. 3, 1951 |

UNITED STATES PATENT OFFICE
CERTIFICATE OF CORRECTION

Patent No. 2,784,172                                                March 5, 1957

Robert J. Slocombe et al.

It is hereby certified that error appears in the printed specification of the above numbered patent requiring correction and that the said Letters Patent should read as corrected below.

Column 2, lines 53 and 54, for "gamma-butyrolacetone" read -- gamma-butyrolactone --.

Signed and sealed this 6th day of August 1957.

(SEAL)
Attest:

KARL H. AXLINE
Attesting Officer

ROBERT C. WATSON
Commissioner of Patents